United States Patent Office 2,750,349
Patented June 12, 1956

2,750,349

COMPOSITIONS, INCLUDING POLYSTYRENE AND TERPHENYL

David Hale O'Herren, Indianapolis, Ind., assignor to Radio Corporation of America, a corporation of Delaware No Drawing. Application October 6, 1952, Serial No. 313,371

15 Claims. (Cl. 260—23.7)

This invention relates in general to improved synthetic resin molding compositions and, more particularly, to improved compositions which include polystyrene and certain wax-like materials which are of the class of terphenyls.

It has previously been proposed to mold many different kinds of articles, including phonograph records, from synthetic resinous compositions, including polystyrene. In molding phonograph records, however, from compositions including polystyrene, certain disadvantages have been found. When these compositions are mixed in a Banbury mixer, the relatively high temperatures necessary to obtain complete fusion of the compositions frequently cause the material to stick to the metal parts of the mixer and also to stick to the mill rolls which are used for sheeting the material after mixing.

When molding phonograph records, it is usually desired to preheat biscuits, or preforms, of the molding material on a steam table. If polystyrene is an ingredient of these compositions, the biscuits often stick to the metal of the steam table. Another difficulty which has been experienced with compositions containing polystyrene has been that the compound, after mixing in the Banbury, is usually too stiff to be sheeted smoothly. As a consequence, the preforms out of which the articles are molded are difficult to obtain in uniform sizes.

A desirable property of any molding material is the ability to flow readily under pressure when heated. In the case of compositions including substantial amounts of polystyrene, it has been found that the flow period is relatively long. That is, the time required for a quantity of the material to flow through a bore of given diameter under a given pressure and at a given temperature is relatively high compared to many other resins. The practical result of the presence of this property is that relatively long press heating cycles are required in order to get adequate molding. In many cases, even with long heating cycles, the articles which are molded have a laminated cross section which causes low flexural strength.

It has been found further that wear resistance of polystyrene molded products has usually been poor due in part to the foregoing molding difficulties. Also, tear resistance of articles having thin cross sections, such as .030 inch, has often been unsatisfactory.

In the present invention, the foregoing disadvantages have been overcome by including in the molding compositions which contain polystyrene as a major resinous ingredient, substantial percentages of at least one material selected from the class consisting of ortho-, meta-, and para-terphenyls. Any mixture of these terphenyls may be used. Another name for para-terphenyl is 1,4-diphenylbenzene. These materials are soft solids with a somewhat waxy nature although they are not generally thought of as being waxes. In the present specification, when waxes are mentioned, the term is not intended to include the terphenyls.

One object of the present invention is to provide improved synthetic resin molding compositions, including major amounts of polystyrene, which are suitable for making phonograph records.

Another object of the present invention is to provide improved polystyrene molding compositions which have relatively good fusing properties.

Another object of the present invention is to provide improved polystyrene molding compositions which have less tendency to stick to metal parts than previously used molding compositions of this type.

Another object of the present invention is to provide improved polystyrene molding compositions which require shorter heating cycles when molding.

Another object of the present invention is to provide improved polystyrene molding compositions capable of producing more uniform molding preforms.

A further object of the present invention is to provide improved polystyrene molding compositions having little or no tendency to form molded objects having a laminated structure.

Still another object of the present invention is to provide improved polystyrene molding compositions which will produce phonograph records having improved resistance to surface wear.

These and other objects will be more readily apparent and the invention will be better understood from the following detailed description including the specific examples of preferred embodiments.

Example I

A molding composition was made by mixing together the following ingredients in the proportions indicated:

| | Percent |
|---|---|
| Polystyrene | 81.55 |
| Carnauba wax | 2.04 |
| Microcrystalline paraffin wax | .82 |
| Zinc stearate | .82 |
| N,N'-diphenyl-p-phenylenediamine | .08 |
| Meta-terphenyl | 8.16 |
| Copolymer of styrene and butadiene | 4.08 |
| Carbon black | 2.45 |

In the above formulation, the amounts of all of the ingredients are expressed as percents by weight.

In making phonograph records of the above formulation, the dry components are first blended in a rotary tumbler and then placed in a Banbury mill. In the Banbury, the materials are further blended and fused into a homogeneous mix. The compound is then removed from the mill and sheeted on a differential roll mill. When the compound cools, the sheet is broken up into uniformly sized biscuits, also called preforms. When molding phonograph records from these preforms, they are softened by heating on a steam table or other heating device and then placed between the metal matrices of the record molding press. Heat and pressure are applied to the press, the record is molded, cooled, removed from the press and trimmed. During molding, the press platens are heated up to about 300 degrees F.

Phonograph records made of the above formulation by the process described have been found to exhibit relatively high wear resistance, such that even fine groove records can be made of the material. Flexural strength and angle of bend are also adequate by commercial standards. Tear resistance of a section having a thickness of .030 inch has been found to be much improved over previously used polystyrene formulations of conventional type. The most important advantages, however, are in the improved compounding and handling of these materials compared to other molding compositions which have included substantial amounts of polystyrene.

The improvements which have resulted from use of the above described type of formulation are due mainly to the inclusion of the relatively high percentages of terphenyl. In addition to the meta-terphenyl, the ortho- or para- forms can be used, as well as any mixture of ortho-, meta-, or para-.

Changes can be made in the above formulation as follows: In compositions which do not contain the styrene-butadiene copolymer, the polystyrene may be varied between about 71.5 and 93%. In compositions which do contain the styrene-butadiene copolymer, the polystyrene may be varied between about 67.8 and about 93%. The polystyrene which is used may have a molecular weight ranging between about 60,000 and about 85,000, although the preferred molecular weight range is between 80,000 and 85,000.

The carnauba wax may be omitted entirely, but, if used, may be present in an amount of from about 0.1% up to about 2.5%. This wax improves the wear resistance of phonograph records molded from these compositions. Many other waxes can be used in place of carnauba wax to perform this function. Another example is candelilla wax.

The microcrystalline paraffin wax may also be omitted entirely and, if used, may be used in an amount of from about 0.1% up to about 3.5%. This ingredient performs the function of aiding in preventing the composition from adhering to the metal parts of the compound handling equipment. Without the presence of the terphenyl, it is not satisfactory in imparting good handling properties to the compositions.

The zinc stearate may be replaced by almost any other metallic soap of a long chain aliphatic fatty acid such as calcium stearate or lead stearate and is used in these compositions as a mold lubricant. This ingredient should be present in the amount between about .5% and 3%.

The N,N'-diphenyl-p-phenylenediamine is a heat stabilizer for the polystyrene. It may be omitted entirely, but if present, is preferably used within a range of about .05% to .5%. Any other conventional thermal stabilizer for polystyrene may be substituted.

The terphenyl is a necessary and important ingredient of the compositions of the present invention. It may be present within a range of about 5 and 15%.

Although it is preferred to use substantial percentages of styrene-butadiene copolymer in these compositions, in order to enhance the resistance to tearing of very thin cross section articles molded from these compositions, if the articles to be molded have thicknesses of, say, greater than about .05 inch, this ingredient can be omitted entirely. When used, it may be present in an amount from 1% up to about 25%. The relative proportions of styrene and butadiene in the copolymer should be about: styrene 40–60%, butadiene 60–40%.

Carbon black is used to impart uniform color to molded articles such as phonograph records. It may be omitted entirely, but if used, should be present in an amount between about .4 and 4% by weight.

An example will now be given of a composition which does not include a styrene-butadiene copolymer.

*Example II*

|  | Percent |
| --- | --- |
| Polystyrene | 85 |
| Equal mixture of ortho-, meta-, and para-terphenyls | 8.4 |
| Carnauba wax | 2 |
| Microcrystalline paraffin wax | 1 |
| Zinc stearate | 1 |
| N,N'-diphenyl-p-phenylenediamine | .1 |
| Carbon black | 2.5 |

The above composition can be used for making phonograph records using a process which is substantially the same as that of the previous example.

The above composition is suitable for making good quality phonograph records provided the thickness is to be greater than about .050 inch. The type of record which is made is substantially non-breakable. Except for tear resistance, the physical properties of the products molded from this composition are substantially the same as products molded from the composition of Example I.

Color can be imparted to the product made of the above described compositions of the present invention by omitting the carbon black and using small percentages of various organic coloring agents.

Where phonograph records are referred to, these are understood to be of conventional disc type having sound grooves impressed on either one or both faces thereof.

What is claimed is:

1. A synthetic resinous molding composition comprising polystyrene 67.8 to 93%, a metal soap 0.5 to 3%, and a material consisting of at least one substance selected from the group consisting of ortho-, meta-, and para-terphenyl 5 to 15%.

2. A composition according to claim 1 including minor amounts of wax, a thermal stabilizer for said polystyrene, and carbon black.

3. A synthetic resinous molding composition comprising polystyrene 71.5 to 93%, a metal soap 0.5 to 3%, wax 0.2 to 6%, thermal stabilizer for said polystyrene 0.05 to 0.5%, carbon black 0.4 to 4%, and a material consisting of at least one substance from the group consisting of ortho-, meta-, and para-terphenyl 5 to 15%.

4. A synthetic resinous molding composition comprising polystyrene 67.8 to 93%, a resinous copolymer of styrene and butadiene 1 to 25%, a metal soap 0.5 to 3%, and a material consisting of at least one substance selected from the group consisting of ortho-, meta-, and para-terphenyl 5 to 15%.

5. A composition according to claim 4 including minor amounts of wax, a thermal stabilizer for said polystyrene, and carbon black.

6. A molding composition consisting essentially of polystyrene 81.55%, carnauba wax 2.04%, microcrystalline paraffin wax 0.82%, zinc stearate 0.82%, N,N'-diphenyl-p-phenylenediamine 0.08%, meta terphenyl 8.16%, copolymer of styrene and butadiene 4.08%, and carbon black 2.45%.

7. A molding composition consisting essentially of polystyrene 85%, any mixture of ortho-, meta-, and para-terphenyls 8.4%, carnauba wax 2%, microcrystalline paraffin wax 1%, zinc stearate 1%, N,N'-diphenyl-p-phenylenediamine 0.1%, and carbon black 2.5%.

8. An article of manufacture comprising a molded body made of a synthetic resinous composition comprising polystyrene 67.8 to 93%, a metal soap 0.5 to 3%, and a material consisting of at least one substance selected from the group consisting of ortho-, meta-, and para-terphenyl 5–15%.

9. An article according to claim 8 in which said molded body is a phonograph record.

10. An article of manufacture comprising a molded body made of a synthetic resinous composition comprising polystyrene 71.5 to 93%, a metal soap 0.5 to 3%, wax 0.2 to 6%, thermal stabilizer for said polystyrene 0.05 to 0.5%, carbon black 0.4 to 4.0%, and a material consisting of at least one substance from the group consisting of ortho-, meta-, and para-terphenyl 5 to 15%.

11. An article according to claim 10 in which said molded body is a phonograph record.

12. An article of manufacture comprising a molded body made of synthetic resinous composition comprising polystyrene 67.8 to 93%, a resinous copolymer of styrene and butadiene 1 to 25%, a metal soap 0.5 to 3%, and a material consisting of at least one substance selected from the group consisting of ortho-, meta-, and para-terphenyl 5 to 15%.

13. An article according to claim 12 in which said molded body is a phonograph record.

14. A phonograph record made of a composition consisting essentially of polystyrene 81.55%, carnauba wax 2.04%, microcrystalline paraffin wax 0.82%, zinc stearate 0.82%, N,N'-diphenyl-p-phenylenediamine 0.08%, meta-terphenyl 8.16%, copolymer of styrene and butadiene 4.08%, and carbon black 2.45%.

15. A phonograph record made of a composition consisting essentially of polystyrene 85%, an equal mixture of ortho-, meta-, and para-terphenyls 8.4%, carnauba wax 2%, microcrystalline paraffin wax 1%, zinc stearate 1%, N,N'-diphenyl-p-phenylenediamine 0.1%, and carbon black 2.5%.

References Cited in the file of this patent

UNITED STATES PATENTS

| | | |
|---|---|---|
| 2,317,137 | Fletcher | Apr. 20, 1943 |
| 2,330,108 | Bradshaw | Sept. 21, 1943 |
| 2,383,145 | Moose | Aug. 21, 1945 |
| 2,397,093 | Dreyfus et al. | Mar. 26, 1946 |
| 2,456,413 | Hunt | Dec. 14, 1948 |
| 2,616,862 | Ayers | Nov. 4, 1952 |
| 2,636,867 | Humfeld | Apr. 28, 1953 |
| 2,681,323 | Groff et al. | June 15, 1954 |